US00RE49909E

(19) United States
(12) Reissued Patent
Sondbø et al.

(10) Patent Number: US RE49,909 E
(45) Date of Reissued Patent: Apr. 9, 2024

(54) REMOVAL OF UNDESIRED COMPONENTS FROM OIL COMPOSITIONS

(71) Applicant: BASF AS, Lysaker (NO)

(72) Inventors: Sverre Sondbø, Sandefjord (NO); Olav Thorstad, Porsgrunn (NO)

(73) Assignee: BASF AS, Lysaker (NO)

(21) Appl. No.: 16/353,762

(22) Filed: Mar. 14, 2019

Related U.S. Patent Documents

Reissue of:
(64) Patent No.: 9,447,360
Issued: Sep. 20, 2016
Appl. No.: 14/440,153
PCT Filed: Oct. 31, 2013
PCT No.: PCT/EP2013/072807
§ 371 (c)(1),
(2) Date: May 1, 2015
PCT Pub. No.: WO2014/068056
PCT Pub. Date: May 8, 2014

U.S. Applications:
(60) Provisional application No. 61/721,845, filed on Nov. 2, 2012.

(51) Int. Cl.

| | |
|---|---|
| ***C11B 3/00*** | (2006.01) |
| ***A23D 9/00*** | (2006.01) |
| ***A23D 9/02*** | (2006.01) |
| ***A23K 20/158*** | (2016.01) |
| ***A23K 50/80*** | (2016.01) |
| ***A23L 5/20*** | (2016.01) |
| ***A23L 33/12*** | (2016.01) |
| ***C11B 3/06*** | (2006.01) |
| ***C11B 3/12*** | (2006.01) |

(52) U.S. Cl.
CPC ..... *C11B 3/001* (2013.01); *A23D 9/00* (2013.01); *A23D 9/02* (2013.01); *A23K 20/158* (2016.05); *A23K 50/80* (2016.05); *A23L 5/23* (2016.08); *A23L 33/12* (2016.08); *C11B 3/006* (2013.01); *C11B 3/06* (2013.01); *C11B 3/12* (2013.01); *A23V 2002/00* (2013.01)

(58) Field of Classification Search
CPC . C11B 3/001; C11B 3/006; C11B 3/06; C11B 3/12; C11B 3/02; C11B 3/04; A23D 9/00; A23D 9/02; A23K 20/158; A23K 50/80; A23L 5/23; A23L 33/12; A23V 2002/00
See application file for complete search history.

(56) References Cited

U.S. PATENT DOCUMENTS

| | | | | |
|---|---|---|---|---|
| 4,554,107 | A | 11/1985 | Takao | |
| 4,613,410 | A * | 9/1986 | Rivers, Jr. | B01D 3/10 203/79 |
| 8,258,330 | B1 | 9/2012 | Harting Glade et al. | |
| 2015/0126760 | A1 | 5/2015 | Doisaki et al. | |

FOREIGN PATENT DOCUMENTS

| | | | | |
|---|---|---|---|---|
| DE | 2311929 | A1 * | 4/2011 | C11B 3/001 |
| EP | 2311929 | A1 | 4/2011 | |
| EP | 2502500 | A1 | 9/2012 | |
| EP | 2851361 | | 3/2015 | |
| JP | S55-73793 | A | 6/1980 | |
| JP | 62-145099 | | 6/1987 | |
| JP | 2012-110809 | | 4/2013 | |
| WO | 9964547 | A1 | 12/1999 | |
| WO | WO 99/64547 | | 12/1999 | |
| WO | WO 9964547 | A1 * | 12/1999 | A23D 9/00 |
| WO | 2004007654 | A1 | 1/2004 | |
| WO | WO 2004007654 | A1 * | 1/2004 | A23D 9/00 |
| WO | 2010/126136 | | 11/2010 | |
| WO | 2012002210 | A1 | 1/2012 | |

OTHER PUBLICATIONS

Julshamn K. et al., "Removal of DDT and its metabolites from fish oils by molecular distillation," Fiskeridirektoratets Skrifter, Serie. Teknologiske Undersokelser—Report on Technological Research Concerning Norwegian Fishindustry, Directorate of Fisheries, Bergen, No, vol. 5, No. 15, pp. 3-11 (1973).

International Search Report of International Application No. PCT/EP2013/072807, dated Mar. 11, 2014.

Martin, Re, et al., eds. Marine and freshwater products handbook, CRC Press, 2000.

Febrianto, NA, and Tajul, AY, "Producing high quality edible oil by using eco-friendly technology: a review," Advance Journal of Food Science and Technology, 3.4, 317-326 (2011).

Jacobsen, C, et al., "Processing of marine lipids and factors affecting their quality when used for functional foods," The Noridic Network for Marine Functional Food (MARIFUNC), 89 (2009).

Bimbo, AP, "Guidelines for characterizing food-grade fish oil," International news on fats, oils and related materials, 9(5), 473-483 (1998).

Okada, T, et al., "Recovery and characterization of sardine oil extracted by pH adjustment," Journal of agricultural and food chemistry, 55.5, 1808-1813 (2007).

JOCS Standard Methods for the Analysis of Fats, Oils and Related Materials (2003 Edition).

(Continued)

*Primary Examiner* — Jerry D Johnson
(74) *Attorney, Agent, or Firm* — Reed Smith LLP; Robert R. Riddle; Hallie H. Wimberly

(57) ABSTRACT

The present invention refers to a process for reducing the amount of undesired components in an oil composition, particularly in an oil composition comprising omega-3 polyunsaturated fatty acids. The process of the present invention provides efficient removal of undesired water-soluble (hydrophilic) components and undesired fat-soluble (lipophilic) components from an oil composition in order to obtain a purified concentrate, e.g. a highly purified concentrate enriched in omega-3 polyunsaturated fatty acids.

19 Claims, No Drawings

(56) References Cited

OTHER PUBLICATIONS

Young, FVK, "The Chemical & Physical Properties of Crude Fish Oils," International Association of Fish Meal Manufactures, 1-18 (1986).
Carboxylic Acid Unknowns and Titration, taken from syllabus of Minnesota State University Moorhead, Chem 365 Lab Schedule Spring 2018 (available at http:/web.mnstate.edu/jasperse/chem365/Acid%20Unknown.doc.pdf.
Petition For Post-Grant Review Under 35 U.S.C. §§ 321-329 AND 37 C.F.R. § 42.200 Et. Seq.—U.S. Pat. No. 9,447,360.
Patent Owner's Preliminary Response To Petition For Post-Grant Review Of U.S. Pat. No. 9,447,360, Post-Grant Review No. 2017-00033.
Patent Owner's Response, Post-Grant Review No. 2017-00033.
Petitioner's Reply to Patent Owner's Response, Post-Grant Review No. 2017-00033.
Final Written Decision And Related Orders, Post-Grant Review No. 2017-00033.
Declaration Of Eric A. Decker, Ph.D. In Support Of Patent Owner's Response, Post-Grant Review No. 2017-00033.
Declaration Of Fereidoon Shahidi, Ph. D. In Support Of Petition For Post-Grant Review Of Claims 1-26 Of U.S. Pat. No. 9,447,360 , Post-Grant Review No. 2017-00033.
Lovaza package insert.
Hui Y.H. et al., "A Primer on Oils Processing Technology," Bailey's Industrial Oil and Fat Products, Edible Technology, John Wiley & Sons, Inc., New York, pp. 1-60 (1996).
Julshamn K. et al., "Removal of DDT and its metabolites from fish oils by molecular distillation," Fiskeridirektoratets Skrifter, Serie. Teknologiske Undersokelser—Report on Technological Research Concerning Norwegian Fishindustry, Directorate of Fisheries, Bergen, No, vol. 5, No. 15, pp. 3-11 (1978).
International Search Report of International Application No. PCT/EP2013/072807, Mar. 11, 2014.
Young, V., "Processing of Oils and Fats," Chemistry and Industry, pp. 692-703 (1978).

* cited by examiner

REMOVAL OF UNDESIRED COMPONENTS FROM OIL COMPOSITIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a national stage filing under 35 U.S.C. §371 of International Application No. PCT/EP2013/072807, filed on Oct. 31, 2013, which claims priority of U.S. Provisional Patent Application No. 61/721,845 filed on Nov. 2, 2012, all of which are incorporated herein by reference.

TECHNICAL FIELD OF THE INVENTION

The present invention refers to a process for reducing the amount of undesired components in an oil composition, particularly in an oil composition comprising omega-3 polyunsaturated fatty acids. The process of the present invention provides efficient removal of undesired water-soluble (hydrophilic) components and undesired fat-soluble (lipophilic) components from an oil composition in order to obtain a purified concentrate, e.g. a highly purified concentrate enriched in omega-3 polyunsaturated fatty acids.

BACKGROUND

Unfortunately human activity has led to a widespread distribution of pollutants in the environment. Persistent organic pollutants (POPs) are accumulated through the food chain, making predatory animals and humans particularly vulnerable to their harmful effects. Of special concern are fat-soluble persistent environmental pollutants, which end up in the fat tissue of organisms like fish and sea mammals. Unfortunately, this type of chemicals frequently can be found in body oils and liver oils from fish, as well as in oil from marine mammals like seals and whales. Farmed fish, like salmon and trout, are exposed to pollutants through fish oil used in their feed. If consumed by humans, the pollutants may accumulate in the human organism. Because of the extremely slow degradation rate, persistent environmental pollutants will tend to increase as the individual gets older.

POP exposure can cause death and illnesses including disruption of the endocrine, reproductive and immune systems, neurobehavioral disorders; and cancers. In pregnant and lactating women, POP can be transferred to the fetus or infant baby through the mother or the mother's milk, potentially harming the developing infant.

The level of pollutants in nature raises concerns, both for nature and wildlife itself, but also for human consumption of oils from such sources. Therefore there is a need for methods to reduce the concentration of pollutants in oils for human or animal consumption.

Animal oils, including fish oils, contain cholesterol. Frequently it is necessary or desirable to remove cholesterol before edible oils are used for food, health supplements or pharmaceuticals.

WO 2004/007654 describes a process for decreasing environmental pollutants in an oil or fat by adding a volatile working fluid before subjecting the oil to a stripping process, e.g. short path evaporation, molecular distillation or a similar process. WO 2004/007655 describes a related type of process, where e.g. fatty acid ethyl or methyl esters are used as a working fluid, for the reduction of cholesterol.

According to these documents, the addition of an external volatile working fluid to a triglyceride oil before molecular distillation gives a more efficient process, resulting in higher removal rates of pollutants or cholesterol. Addition of a volatile working fluid also allows for the use of lower temperatures and/or increased capacity of the production equipment. Reduced process temperatures and holding times (resulting from increased flow rates) are important to prevent degradation of the double bonds of polyunsaturated fats, like EPA and DHA in marine oils.

WO 2004/007654 also describes the use of free fatty acids naturally contained in marine oils as an internal working fluid in a stripping process. Thereby, the addition of an external working fluid can be avoided.

However, using free fatty acids contained in the untreated crude oil as an internal working fluid also has disadvantages. Crude oil products normally contain small amounts of hydrophilic components such as water-soluble proteins, peptides etc. Such proteinaceous or other components might cause problems when present in a stripping processing step since they tend to burn into the heating surfaces of the equipment used for short path evaporation or molecular distillation, where temperatures frequently can be about 200° C. or higher.

In commercial full scale production huge volumes of crude oils will normally be processed. Even if concentrations of proteins, peptides and other water-soluble components in the crude oil are small, processed oil volumes normally will be high, and build-up of scaling, i.e. deposition of particulate matter, from such hydrophilic components on the evaporator heating surfaces might after a relatively short time create technical or quality problems.

Examples of potential problems are reduced heat transfer from the heating medium to the oil film, impurities of loosened scaling in the stripped oil, restrictions in the flow lines etc. Such problems might be solved by increasing the frequency of cleaning the equipment. However cleaning of evaporators and other equipment that has been used for stripping of marine oils is not a trivial matter. If using untreated crude oil, containing free fatty acids as an internal working fluid, the equipment might for instance have to be cleaned at least on a weekly or bi-weekly basis instead of for instance every three months. The necessary cleaning frequency will vary with use, requirements, incoming oil quality and throughput in the equipment.

To fully remove heavy scaling from this type of equipment in-line cleaning with a caustic cleaning agent will normally not be sufficient, but dismantling the system with removal of the internal wiper unit might be necessary. For industrial scale equipment removal of a vertically mounted, several meters long, stainless steel wiper unit for cleaning is a time consuming process. After cleaning it is important to take care that all connections are without even small leaks, and water must be completely removed from the system to allow generating the deep vacuum needed for the stripping process. For these reasons cleaning of such systems is very time-consuming and costly. Reduced frequency of cleaning therefore is very important to reduce down-time, and can be vital for productivity and process economics.

In up to date commercial processes, the crude oil is deacidified by alkali refining prior to the stripping process thereby removing the free fatty acids present in the crude oil. In addition, alkali refining will also wash out hydrophilic components, such as proteinaceous matter, thereby reducing build-up of scaling in the equipment used for stripping.

However, since the free fatty acids are removed before stripping, an external working fluid has to be added for the stripping process.

SUMMARY OF THE INVENTION

The present invention refers to the use of free fatty acids contained in a crude oil composition as an internal working fluid for a stripping process while at the same time reducing or eliminating the risk of scaling from hydrophilic components such as proteins, peptides etc. on the heating surfaces of the stripping equipment. This can be achieved by performing a partial alkali refining before stripping, using sub-equimolar amounts of base, i.e. less than the amount of base needed to neutralise all the free fatty acids present in the crude oil composition to soaps. Alternatively, for certain applications, the oil may instead be washed with an aqueous fluid essentially without base.

Thus, an aspect of the present invention is a process for reducing the amount of undesired components in an oil composition, comprising:

(a) providing a crude oil composition comprising undesired hydrophilic components, undesired lipophilic components and free fatty acids, (b) subjecting the crude oil composition to an aqueous fluid processing step, wherein hydrophilic components are separated from the crude oil composition under conditions to obtain an oil composition which comprises free fatty acids in an amount which is effective as an internal volatile working fluid, (c) subjecting the oil composition after step (b) to a stripping processing step in the presence of free fatty acids as an internal volatile working fluid, wherein lipophilic components are separated from the oil composition together with free fatty acids, and (d) optionally subjecting the composition from step (c) to further processing steps.

According to the present invention, first undesired hydrophilic components are removed in an aqueous fluid processing step from a crude oil composition. This aqueous fluid processing step is performed under conditions designed for the remaining amount of free fatty acids in the oil composition to reach a level which is effective as an internal volatile working fluid in a subsequent stripping processing step, in which undesired lipophilic components can be stripped off preferably without adding an external volatile (lipophilic) working fluid to the oil composition.

Thus, the present invention addresses the issue of undesired scaling on the heating surfaces by using free fatty acids naturally contained in the oil as an internal working fluid for stripping to remove undesired lipophilic components, e.g. environmental pollutants and cholesterol. In addition, total oil yields can be significantly improved compared to the established stripping process described in WO 2004/007654 and WO 2004/007655. During normal alkaline deacidification prior to stripping, using more than equimolar amount of alkali, the deacidification causes significant losses of triglyceride oil, caused by hydrolysis of triglycerides and other losses. During deacidification of fish oil frequently 2-5% of triglyceride oil can be lost, in addition to the desired loss of the free fatty acid fraction. The following stripping process with an added working fluid also involves losses of triglyceride oil, typically 1-4%. Using the disclosed method typical oil yields for the partial deacidification will be higher than for an ordinary deacidification process, since less caustic is used. Therefore the hydrolysis of triglycerides will be reduced. The triglyceride oil yield for the stripping process according to the present invention is expected to be similar to or higher compared to the established stripping process using an external working fluid. The disclosed method therefore offers an opportunity of increased oil yields.

Another advantage of the disclosed method is that the need for adding an external working fluid is eliminated. This can reduce the cost of producing, buying, storing, adding and mixing the right amount of working fluid.

Alkaline deacidification of marine oils with very high acid values (above 15 mg KOH/g) can be very hard to achieve, and oil losses can be extensive. The disclosed method provides an option for efficient deacidification of such oils, while improving triglyceride oil yields.

DETAILED DESCRIPTION OF PREFERRED EMBODIMENTS

The present invention refers to a process for reducing the amount of undesired hydrophilic and lipophilic components in an oil composition, particularly in an oil composition comprising omega-3 polyunsaturated fatty acids, more particularly (all cis)-5,8,11,14,17-eicosapentaenoic acid (EPA) and/or (all cis)-4,7,10,13,16,19-docosahexaenoic acid (DHA). Undesired hydrophilic components are removed by an aqueous fluid processing step and subsequently undesired lipophilic components are removed by a stripping processing step in the presence of free fatty acids as an internal volatile working fluid. Optionally, the process may include further processing steps, including steps for increasing the level of omega-3 polyunsaturated fatty acids in the oil composition.

Step (a) of the process of the invention comprises providing a crude oil composition comprising undesired hydrophilic components, undesired lipophilic components and free fatty acids.

Undesired hydrophilic components include but are not limited to proteinaceous compounds such as proteins, peptides and other water-soluble components. These components may be present in a crude oil composition usually in an amount of less than 0.1% by weight. In a preferred embodiment, the hydrophilic components are proteinaceous compounds such as proteins and peptides.

Undesired lipophilic components include but are not limited to cholesterol and environmental pollutants, particularly persistent organic pollutants such as aromatic and/or halogenated hydrocarbons and organic metal compounds, particularly DDTs and its metabolites, polychlorinated biphenyl (PCBs)s, dibenzo-dioxins, dibenzo-furans, chlorophenols, hexachlorocyclohexanes (HCHs), toxaphenes, polychlorinated triphenyls, brominated flame retardants, polyaromatic hydrocarbons (PAHs), chlorinated pesticides, organic tin compounds and organic mercury compounds. Of particular importance is the removal of polychlorinated biphenyls, such as dioxin-like PCBs, brominated flame-retardants such as polybrominated diphenyl ethers (PBDEs), tetrabromobisphenol A (TBBPA), hexabromocyclododecane (HBCDD), perfluorinated compounds and combinations thereof.

In one embodiment of the invention the dioxins are selected from the group consisting of 2378-TCDD, 12378-PeCDD, 123478-HxCDD, 123678-HxCDD, 123789-HxCDD, 1234678-HpCDD and OCDD.

In another embodiment of the invention the furans are selected from the group consisting of 2378-TCDF, 12378/12348-PeCDF, 23478-PeCDF, 123478/123479-HxCDF, 123678-HxCDF, 123789-HxCDF, 234678-Hx-CDF, 1234678-HpCDF, 1234789-HpCDF and OCDF.

In a third embodiment of the invention the PCBs are selected from the group consisting of non-ortho-PCBs such as 33'44'-TeCB (PCB-77), 344'5-TeCB (PCB-81), 33'44'5-PeCB (PCB-126), 33'44'55'-HBC (PCB-169), and further PCBs such as 2,2',5-TriCB, 2,4,4'-TriCB, 2,4',5-TriCB, 2',3,4-TriCB, 3,4,4'-TriCB, 2,2',4,4'-TetCB, 2,2',5,5'-TetCB, 2,3',4,4'-TetCB, 2,4,4',5-TetCB, 2,2',4,4',5-PenCB, 2,2',4,5,5'-PenCB, 2,3,3',4,4'-PenCB, 2,3,4,4',5-PenCB, 2,3',4,4',5-PenCB, 2',3,3',4,5-PenCB, 2',3,4,4',5-PenCB, 2,2',3,3',4,4'-HexCB, 2,2',3,4,4',5'-HexCB, 2,2',3,5,5'-HexCB, 2,2',3,4',5',6-HexCB, 2,2',4,4',5,5'-HexCB, 2,3,3',4,4',5-HexCB, 2,3,3',4,4',5'-HexCB, 2,3',4,4',5,5'-HexCB, 2,2',3,3',4,4',5-HepCB, 2,2',3,4,4',5,5'-HepCB, 2,2',3,4,4',5',6-HepCB, 2,2',3,4',5,5',6-HepCB, 2,3,3',4,4',5,5'-HepCB, 2,2',3,3',4,4',5,5'-OctCB, 2,2',3,3',4,4',5,5',6-NonCB and DecaCB and in addition Pentachlorobenzene (PeCB) and Hexachlorobenzene (HCB).

In a fourth embodiment of the invention the chlorinated pesticides are selected from the group consisting of dieldrin, aldrin, isodrin, endrin, heptachlor-exo-epoxide, heptachlor-endo-epoxide, trans-chlordane, cis-chlordane, oxy-chlordane, chlordane, heptachlor and endosulfan-I.

In a fifth embodiment of the invention the hexachlorocyclohexanes are selected from the group consisting of alpha-HCH, beta-HCH, gamma-HCH (Lindane) and delta-HCH.

In a sixth embodiment of the invention the DDTs are selected from the group consisting of o,p'-DDE, p,p'-DDE, o,p'-DDD, p,p'-DDD, o,p'-DDT, p,p'-DDT.

Definitions of the compounds mentioned above are according to the Stockholm Convention on Persistent Organic Pollutants (POPs) and relevant EU regulations on POPs in food.

The starting material may be any crude oil composition comprising ω-3 polyunsaturated fatty acids. The crude oil may be a vegetable oil, such as corn oil, palm oil, rape seed oil, soy bean oil, sunflower oil and olive oil. Preferably, the starting material is a marine oil, i.e. an oil originating at least partially from marine organisms such as fish, sea mammals, crustaceans, mollusks, algae and/or plankton. More preferably, the starting material is a fish oil, e.g. from sardine, anchovy, mackerel, menhaden, tuna, cod, or salmon, or an oil from marine non-vertebrates such as krill, mollusks, algae, yeasts, fungal cells and bacteria, and mixtures thereof. Even more preferably, the starting material can be oil obtained from fish of families such as Engraulidae, Carangidae, Clupeidae, Osmeridae, Salmonidae and Scombridae, or from animals of the class Cephalopoda, or from animals of the orders Euphausiacea or Calanoida, e.g. from krill and calanus, or from single cell oils. Single cell oils are defined as oils derived from microbial cells (including algae, yeasts, fungal cells and bacteria) and which may be destined for human consumption.

The crude oil comprises fatty acids in at least one of the triglyceride and phospholipid forms. For example, the crude oil composition may comprise triglycerides and/or phospholipids, preferably triglycerides, in the range of at least about 50%, about 60%, about 70%, about 80%, or about 90% by weight, based on the total weight of the crude oil composition.

Commercially available crude (unrefined) triglyceride oils, particularly marine oils, normally contain a certain amount of free fatty acids, formed by hydrolysis of the triglyceride oil. The hydrolysis might be enzymatic, caused by enzymes within the source material, e.g. fish, and/or caused by chemical reactions during storage of the source material, e.g. sea animal, fish, liver or other organ, and/or during processing, transportation or storage of the oil. Regardless of the mechanism, free fatty acids and di- or monoglycerides are formed from triglycerides in the hydrolytic reaction.

Crude oils will contain higher or lower concentrations of free fatty acids, depending on the degree of hydrolysis. The actual concentration of free fatty acids in a crude oil may be determined by the acid value test. The acid value can be found by titration of the oil with a caustic solution, and has a long tradition for being used as a quality parameter for edible oils. For most common triglyceride oils the percentage of free fatty acids can be estimated to be roughly half the acid value (reported as mg KOH/g).

Usually, the content of free fatty acids in crude fish oils will vary for different oil qualities, but an acid value of about 5-15 mg KOH/g, corresponding to about 2.5-7.5% by weight of free fatty acids, can be regarded as normal for crude fish oils, of which the oils with the higher amounts can be regarded as oils of low quality.

According to the present invention, the crude oil composition used as starting material has a content of preferably more than 1%, more preferably between about 1% and about 10%, most preferably between about 2.5 and about 7.5% by weight of free fatty acids based on the total weight of the crude oil composition.

Step (b) comprises subjecting the crude oil composition to an aqueous fluid processing step. In this step, undesired hydrophilic components present in the crude oil composition are separated therefrom. The aqueous fluid processing step may comprise either no deacidification, i.e. no removal of free fatty acids or a partial deacidification, i.e. a partial removal of free fatty acids. As a result, an oil composition is obtained which is substantially free from undesired hydrophilic components and comprises free fatty acids in an amount which is effective as an internal volatile working fluid in the subsequent processing step (c).

A "working fluid" in the context of the present invention is a composition that is effective in removing undesired lipophilic components from crude oil compositions during a stripping processing step. An "internal working fluid" is already present in the starting material, whereas an "external working fluid" is added at some stage during processing of the starting material. The working fluid has a suitable volatility in relation to the lipophilic components to be removed.

The working fluid of the present invention consists of free fatty acids contained in the crude oil composition. Typically, this is a mixture of free fatty acids having 16 to 22 carbon atoms. That is, the working fluid of the present invention is typically more volatile than some of the lipophilic components to be removed and less volatile than others. This is because the volatility of the POPs are variable from e.g. Trichloro-PCB which has relatively high volatility to e.g. Decachloro-PCB which has relatively low volatility.

Step (b) comprises treatment of the crude oil composition with an aqueous fluid under conditions wherein undesired hydrophilic components in the crude oil composition are at least partially removed. The aqueous fluid in step (b) is a water-based fluid which may contain salts such as for instance sodium chloride, potassium chloride, sodium sulfate, ammonium nitrate or other salts for improving phase separation. Additionally, various acids, both organic and inorganic, will work as de-emulsifiers.

In industrial processes for deacidification normally an excess amount of alkali is added (more than equimolar amounts compared to the amount of free fatty acids) to achieve a close to complete removal of free fatty acids to an acid value close to 0 (preferably 0.6 mg KOH/g or less)

before stripping. When using excess amounts of alkali, however, there is a risk of saponification of the triglycerides present in the oil, with corresponding increased oil losses. In contrast thereto, the present invention avoids the use of equimolar or even higher amounts of alkali. Therefore, the process of the invention will have the advantage of improved oil yields in the overall process.

In one embodiment, step (b) is carried out without deacidification, i.e. without removal of substantial amounts (e.g. removal of less than 0.3% by weight) of free fatty acids. Thus, the aqueous fluid processing step does not require the use of a base and the crude oil composition may be contacted with an aqueous fluid essentially without a base. Water, which may contain salts such as for instance sodium chloride, potassium chloride, sodium sulfate, ammonium nitrate or other salts for improving phase separation may be used. Additionally, various acids, both organic and inorganic, will work as de-emulsifiers. In some cases, the aqueous fluid processing step may be conducted under acid conditions, e.g. in the presence of phosphoric and/or citric acid.

In another embodiment, step (b) is carried out with partial deacidification, i.e. with partial removal, e.g. up to about 10%, up to about 30%, up to about 50%, up to about 70% or up to about 90% by weight of free fatty acids (based on the total weight of fatty acids in the crude oil composition). Thus, the aqueous fluid processing step comprises contacting the crude oil composition with an aqueous fluid comprising a sub-equimolar amount of base with regard to the molar amount of free fatty acids in the crude oil composition, wherein the free fatty acids present in the crude oil composition are partially neutralized. The aqueous fluid may in addition contain salts such as sodium chloride, potassium chloride, sodium sulfate, ammonium nitrate or other salts, as mentioned supra.

The neutralized fatty acids present as salts (also called soaps) may be removed from the composition together with the aqueous fluid. The actual amount of base used in step (b) may be calculated on the basis of the amount of free fatty acids in the crude oil composition and the desired amount of free fatty acids after step (b).

The base may be an alkaline metal or alkaline earth metal hydroxide, particularly sodium and/or potassium hydroxide. Preferably, the base is contacted with the crude oil composition as an aqueous alkaline solution. The alkaline solution will preferably be sodium hydroxide in water, but also potassium hydroxide or other caustic aqueous solutions can be used. Methods for deacidification of triglyceride oils are well known, and both batch and continuous methods can be used.

A partial deacidification can alternatively be performed by other methods known in the art, such as steam deacidification, adsorption (for instance with magnesium oxide and/or silica gel), solvent extraction, a combination of solvent extraction with ethanol and membrane technology (WO 2008/002154) or reesterification of the free fatty acid to triglycerides, for instance using a lipase or other catalyst.

Preferably, the aqueous fluid processing step (b) is conducted under conditions that the content of free fatty acids in the oil composition after step (b) is from about 0.5% by weight to about 5% by weight, preferably from about 1% by weight to about 3% by weight, most preferably about 2% by weight.

The aqueous fluid processing step may be carried out as a batch or continuous process. Contacting the oil and aqueous phase can for instance be performed in a mixed, particularly a stirred tank, by spraying the oil with fluid or by pumping or circulating fluid through the oil, in an in-line static mixer, or other ways. Separation of the fluid used for washing from the oil can be performed by gravity on a tank, or in centrifuges or other types of separators. If a base is used to neutralize free fatty acids, residues of soaps after the separation will normally be removed by a washing step where the oil is contacted with water or a solution containing mainly water, before phase separation. Both batch and continuous processes for alkaline deacidification are well known in the art, and similar processes can be used, but with weaker or no basic solution. Before the stripping process step the aqueous fluid has to be removed from the water-washed or partly deacidified oil, for instance by evaporation under vacuum. The method involving aqueous fluid treatment will also improve overall oil yields compared to the current stripping processes.

The amount of aqueous fluid used in step (b) generally may range from about 1% to about 500% by weight based on the weight of the crude oil composition. Preferably, the amount of aqueous fluid is from about 2% to about 200% by weight, more preferably from about 3% to about 100% by weight, most preferably from about 5% to about 20% by weight.

The process temperature during step (b) is preferably at least about 50° C. up to below the water boiling point, preferably 90-99° C. Contact time may be up to one hour or more for batch processes, e.g. up to 5 minutes, 10 minutes, 20 minutes, 40 minutes, 60 minutes, and less than 1 minute for continuous processes.

Step (c) comprises subjecting the oil composition after step (b) to a stripping processing step. Preferably, the oil composition is subjected to the stripping processing step following step (b). It is, however, possible to carry out further refining steps, for instance winterization, bleaching, or deodorization between steps (b) and (c).

The process of the present invention does not require the addition of external volatile working fluids in the stripping processing step, since after the aqueous fluid processing step the oil composition comprises a pre-determined amount of free fatty acids as internal working fluid. Thus, in a preferred embodiment, before step (c) no external working fluid, particularly no external working fluid comprising fatty acid esters, fatty acid amides, free fatty acids, hydrocarbons and mixtures thereof is added to the oil composition to be stripped.

The stripping processing step is a distillation or evaporation step for decreasing the amount of undesired lipophilic components in the oil composition. Suitable stripping techniques are described in WO 2004/007654, the content of which is herein incorporated by reference, including but not limited to short path distillation or short path evaporation, thin-film distillation or thin-film evaporation, falling-film distillation or falling-film evaporation and molecular distillation.

The stripping processing step is preferably carried out at a distillation/evaporation temperature from about 150 to about 250° C., more preferably at a temperature from about 170 to about 220° C. under a pressure of less than 1 mbar, more preferably less than 0.1 mbar, even more preferably below 0.01 mbar. A typical product feed rate in a commercial scale process is preferably from 10-200 kg oil/h*$m^2$ heating surface, more preferably from 50-100 kg oil/h*$m^2$ heating surface.

The process of the invention, particularly the performance of steps (b) and (c) can be adapted to the requirements of the oil product and the quality of the incoming crude oil. Requirements can vary for different oils and applications. The final oil product can be the marine triglyceride oil after stripping, alternatively including other purification steps, like for instance bleaching, deodorisation, winterization or other methods. The stripped oil can also be used as an intermediate for further processing, for instance for the production of concentrates of omega-3 fatty acids, typically in the form of triglycerides, methyl esters, ethyl esters or free fatty acids.

During the stripping process in step (c) a considerable amount of the free fatty acids in the incoming oil is removed from the oil and ends up in the distillate fraction (the waste fraction). Depending on equipment, process conditions used for stripping and type of oil between e.g. about 0 to 25% of the free fatty acids in the incoming oil to the stripping process might remain in triglyceride oil after stripping.

Preferably, at least 60% by weight of free fatty acids in step (c) based on the total amount of fatty acids are removed from the oil composition together with undesired lipophilic components. More preferably, at least 75% by weight of free fatty acids based on the total amount of fatty acids are removed from the oil composition together with undesired lipophilic components.

If the process conditions chosen for the stripping processing step (c) for instance reduces the acid value to 10% of its initial value, an incoming (crude) oil with an acid value of 10 mg KOH/g, will after stripping have an acid value of 1 mg KOH/g. Such a value might for certain applications be acceptable, but frequently it is desirable to reduce acid values as much as possible. In general high acid values are regarded as an indication of low quality, and there is a desire to keep acid values as low as possible. Low acid values are desired for oil products with strict quality requirements or for intermediate oils where the acid value will increase during following processing or storage. Thus, a content of free fatty acids of not more than 0.1% by weight after stripping processing step (c) is preferred in some embodiments. In other embodiments, a higher acid value, e.g. corresponding to about 0.1% to about 1.0%, preferably about 0.2% to about 0.8% by weight of free fatty acids after stripping processing step (c), would be acceptable.

If using other methods for deacidification, the process parameters should be set up to leave a certain amount of free fatty acids remaining in the oil after processing, in a similar way as when performing alkaline deacidification.

In cases where the acid value in the crude oil is low, and/or the stripping process parameters are set up for very efficient removal of free fatty acids, and/or requirements for acid value in the stripped oil are not too strict, the crude oil might be pre-treated just by contacting with an aqueous fluid without base, followed by removal of the aqueous fluid, before the stripping process step.

In order to achieve a very low acid value of the oil after stripping there are two options:

i) The crude oil can be partly deacidified as described above. When using alkaline deacidification, the amount of alkali used for deacidification should be adjusted to a level that will produce an intermediate triglyceride oil before stripping where the acid value is sufficiently high for the free fatty acids to act as an efficient internal working fluid in the stripping process. On the other hand the acid value after step (b) should not be too high, to prevent risk that the acid value of the triglyceride oil after stripping might be higher than the maximum allowed level. Preferably the acid value of the triglyceride oil before stripping should be 2-6 mg KOH/g, corresponding to about 1-3% by weight of free fatty acids, However, for certain applications the acid values may also be higher than 6 mg KOH/g. e.g. up to 5% by weight to act as a working fluid.

ii) The stripping process might be adjusted to process parameters that will give a more efficient removal of free fatty acids. This might for example involve increased evaporation temperatures and/or reduced feed rates.

According to step (d), the oil composition from the stripping processing step (c) is optionally subjected to further processing steps which may include an enrichment of polyunsaturated fatty acids.

Thus, by means of the present invention, a purified concentrate enriched in omega-3 polyunsaturated fatty acids, more particularly enriched in EPA and/or DHA, even more particularly enriched in EPA and DHA may be produced from a crude oil composition. The purified concentrate produced by the method of the present invention is particularly suitable for human use, but also for use in animals.

The enrichment steps may include at least one of (i) a hydrolysis or esterification step to produce free fatty acids or monoesters to prepare for following enrichment steps, (ii) a urea complexation step, (iii) a molecular distillation step, and/or (iv) a transesterification step, e.g. with a chemical catalyst, such as a metal alkoxide or an enzyme, such as a lipase.

These steps may be carried out as described in the art.

The further processing steps may include an enrichment of omega-3 fatty acids, particularly of EPA and DHA, to a content of at least 30% by weight, e.g. 35% to 60% by weight, based on the total weight of fatty acids or to a content of at least 70% by weight, e.g. 75% to 90% by weight, based on the total weight of oil product.

In some embodiments, the purified concentrate is used as a nutritional additive. In other embodiments, the purified concentrate may be used as a health supplement or in clinical nutrition. Still further, the concentrate may be used as animal feed, in particular as fish feed. In these embodiments, the concentrate preferably has a content of ω-3 polyunsaturated fatty acids, more preferably a content of an EPA plus DHA of about 30% to about 60% by weight based on the total weight of fatty acids. In other embodiments, the purified concentrate is used as a pharmaceutical preparation. In these embodiments, the content of ω-3 polyunsaturated fatty acids of EPA plus DHA is preferably at least about 70% by weight, more preferably at least about 80% by weight based on the total weight of fatty acids.

The final product may be (i) an omega-3-fatty acid ethyl ester product, (ii) an omega-3-fatty acid triglyceride product or (iii) an omega-3-fatty acid product in the free acid form.

A further aspect of the invention relates to the use of an oil composition which comprises free fatty acids in an amount which is effective as internal volatile working fluid and undesired lipophilic components and which is substantially free from undesired hydrophilic components and from an external volatile working fluid, as a feed material in a stripping processing step for the removal of undesired lipophilic components together with free fatty acids from the oil composition.

Still a further aspect of the invention relates to an oil composition which comprises free fatty acids in an amount which is effective as internal volatile working fluid and undesired lipophilic component and which is substantially free from the undesired hydrophilic components and an external volatile working fluid.

According to the present invention, an effective removal of environmental pollutants from oils may be achieved without the use of an external volatile working fluid. For example, the reduction factor of persistent organic pollutants, particularly pollutants as described in the following Examples, such as polychlorinated dioxins and furans, PCBs, chlorinated pesticides, hexachlorocyclohexanes and DDTs, is at least 90%, particularly at least 95%, more particularly at least 96% and up to 99%, particularly 99.5%, more particularly 99.9%, or even higher.

In one embodiment of the present invention, the total amount of dioxins removed from the crude oil after being subjected to the claimed process is ≥96.1% and up to 99%, particularly 99.5%, more particularly up to 99.9% or even higher.

In another embodiment of the present invention, the total amount of furanes removed from the crude oil after being subjected to the claimed process is ≥98.7% and up to 99%, particularly 99.5%, more particularly up to 99.9% or even higher.

In a third embodiment of the present invention, the total amount of dioxins and furanes removed from the crude oil after being subjected to the claimed process is ≥98% and up to 99%, particularly 99.5%, more particularly up to 99.9% or even higher.

In a fourth embodiment of the present invention, the total amount of non-ortho-PCBs removed from the crude oil after being subjected to the claimed process is ≥99.1% and up to 99.5%, particularly 99.9% or even higher.

In a fifth embodiment of the present invention, the total amount of PCBs removed from the crude oil after being subjected to the claimed process is ≥99.3% and up to 99.5%, particularly 99.9% or even higher.

In a sixth embodiment of the present invention, the total amount of DDTs removed from the crude oil after being subjected to the claimed process is 99.3% and up to 99.5%, particularly 99.9% or even higher.

Further, the present invention is explained in more detail by the following Examples.

EXAMPLES

The raw material for the experiments was a crude fish oil from the Baltic sea with a content of environmental pollutants, cholesterol and acid value as shown in Table 1.

Example 1

Partly Refined Fish Oil 1200 g of the crude fish oil in a 3 liter stirred glass reactor were heated to 90° C. and added slowly and during stirring at 150 rpm 1.01 of a 2% solution of sodium hydroxide in water. After stirring at 300 rpm for 2 minutes, the stirrer was stopped and the mixture left to settle. The aqueous lower phase was removed and discarded. The upper oil phase was washed several times with water at 90° C. until neutrality (pH<9) and dried in the reactor at 90° C. under vacuum and with nitrogen purging. Emulsions formed during both refining and washing steps were broken by stepwise adding a spoonful of sodium chloride followed by stirring for 2 minutes at 300 rpm until phase separation was observed within a reasonable time. The resulting oil had an acid value of 3.5 mgKOH/g which means that approximately half the free fatty acid in the crude oil had been removed.

The refined oil (1071 g) was run through a short path distillation apparatus (UIC KD6) at a film temperature of 210° C., a wiper speed of 300 rpm, a pressure of approx. 0.05 mbar and a feed rate of 2.0 l/h. The final purified fish oil had a content of environmental pollutants and other components as shown in table 1. The acid value was 0.07 mgKOH/g, showing that all free fatty acids had been stripped off.

Example 2

Unrefined, Water Washed Fish Oil 1200 g of the crude fish oil in a 3 liter stirred glass reactor were heated to 90° C., washed 3 times with water at 90° C. and dried in the reactor at 90° C. under vacuum and with nitrogen purging. Emulsions formed were broken by stepwise adding a spoonful of sodium chloride followed by stirring for 2 minutes at 300 rpm until phase separation was observed within a reasonable time.

The resulting washed and dried oil was run through a short path distillation apparatus (UIC KD6) at the same conditions as in example 1. The final purified fish oil had a content of environmental pollutants and other components as shown in table 1. The acid value was 0.23 mgKOH/g, showing that almost all free fatty acids had been stripped off.

The results show that both processes are very efficient in removal of persistent organic pollutants from fish oil. The reduction factor for all components were at 97-99% levels. Even for the heaviest components (DecaCB=Decachlorbiphenyl) the reduction factor was 97-98%. The reduction factor for free cholesterol was 90% for both processes.

TABLE 1

| | | | | Stripped oil | | | |
|---|---|---|---|---|---|---|---|
| | | | | Partly refined oil | | Water washed oil | |
| | IUPAC no. | Unit | Crude oil Value | Value | Reduction factor | Value | Reduction factor |
| Dioxins | | | | | | | |
| 2378-TCDD | | pg/g | 0.35 | <0.01 | | <0.02 | |
| 12378-PeCDD | | pg/g | 0.84 | <0.01 | | 0.02 | |
| 123478-HxCDD | | pg/g | 0.14 | <0.01 | | <0.02 | |
| 123678-HxCDD | | pg/g | 0.67 | 0.01 | | <0.02 | |
| 123789-HxCDD | | pg/g | 0.09 | <0.01 | | <0.02 | |
| 1234678-HpCDD | | pg/g | 0.44 | 0.03 | | 0.05 | |
| OCDD | | pg/g | 1.92 | 0.36 | | 0.31 | |
| SUM PCDD (TEQ-$WHO_{2005}$) | | pg/g | 1.29 | 0.03 | 97.7% | 0.05 | 96.1% |

TABLE 1-continued

| | IUPAC no. | Unit | Crude oil Value | Stripped oil: Partly refined oil Value | Stripped oil: Partly refined oil Reduction factor | Stripped oil: Water washed oil Value | Stripped oil: Water washed oil Reduction factor |
|---|---|---|---|---|---|---|---|
| Furanes | | | | | | | |
| 2378-TCDF | | pg/g | 7.58 | 0.07 | | 0.08 | |
| 12378/12348-PeCDF | | pg/g | 1.27 | 0.01 | | <0.02 | |
| 23478-PeCDF | | pg/g | 7.37 | 0.05 | | 0.07 | |
| 123478/123479-HxCDF | | pg/g | 0.47 | <0.01 | | <0.01 | |
| 123678-HxCDF | | pg/g | 0.56 | <0.01 | | <0.02 | |
| 123789-HxCDF | | pg/g | <0.02 | <0.01 | | <0.02 | |
| 234678-HxCDF | | pg/g | 0.70 | 0.01 | | 0.02 | |
| 1234678-HpCDF | | pg/g | 0.20 | <0.01 | | 0.02 | |
| 1234789-HpCDF | | pg/g | 0.02 | <0.01 | | <0.02 | |
| OCDF | | pg/g | 0.08 | 0.03 | | 0.02 | |
| SUM PCDF (TEQ-$WHO_{2005}$) | | pg/g | 3.19 | 0.03 | 99.1% | 0.04 | 98.7% |
| SUM PCDD/PCDF (TEQ-$HO_{2005}$) | | pg/g | 4.47 | 0.05 | 98.9% | 0.09 | 98.0% |
| non-ortho-PCB | | | | | | | |
| 33'44'-TeCB(PCB-77) | | pg/g | 336 | 2.86 | | 3.35 | |
| 344'5-TeCB(PCB-81) | | pg/g | 11.8 | 0.10 | | 0.09 | |
| 33'44'5-PeCB (PCB-126) | | pg/g | 75.2 | 0.38 | | 0.72 | |
| 33'44'55'-HCB (PCB-169) | | pg/g | 19.3 | 0.14 | | n.a. | |
| SUM non-ortho-PCB (TE-$WHO_{2005}$) | | pg/g | 8.14 | 0.04 | 99.5% | 0.07 | 99.1% |
| PCB's | | | | | | | |
| PeCB | | ng/g | 0.89 | 0.04 | 95.5% | 0.04 | 95.5% |
| HCB | | ng/g | 10.2 | 0.13 | 98.7% | 0.13 | 98.7% |
| 2,2',5-TriCB | 18 | ng/g | 1.59 | 0.02 | | 0.02 | |
| 2,4,4'-TriCB | 28 | ng/g | 2.84 | 0.02 | | 0.02 | |
| 2,4',5-TriCB | 31 | ng/g | 2.31 | 0.02 | | 0.02 | |
| 2',3,4-TriCB | 33 | ng/g | 0.94 | 0.01 | | 0.01 | |
| 3,4,4'-TriCB | 37 | ng/g | 0.19 | <0.01 | | <0.01 | |
| Sum TriCB | | ng/g | 10.2 | 0.07 | 99.3% | 0.08 | 99.2% |
| 2,2'4,4'-TetCB | 47 | ng/g | 2.53 | 0.01 | | 0.02 | |
| 2,2'5,5'-TetCB | 52 | ng/g | 6.54 | 0.03 | | 0.03 | |
| 2,3',4,4'-TetCB | 66 | ng/g | 4.33 | 0.01 | | 0.02 | |
| 2,4,4',5-TetCB | 74 | ng/g | 2.47 | <0.01 | | <0.01 | |
| Sum TetraCB | | ng/g | 19.4 | 0.06 | 99.7% | 0.07 | 99.6% |
| 2,2'4.4',5-PenCB | 99 | ng/g | 6.2 | <0.01 | | 0.01 | |
| 2,2',4,5,5'-PenCB | 101 | ng/g | 13 | 0.05 | | 0.06 | |
| 2,3,3',4,4'-PenCB | 105 | ng/g | 3.53 | <0.01 | | 0.02 | |
| 2,3,4,4',5-PenCB | 114 | ng/g | 0.32 | <0.01 | | <0.01 | |
| 2,3',4,4',5-PenCB | 118 | ng/g | 9.72 | 0.03 | | 0.05 | |
| 2',3,3',4,5-PenCB | 122 | ng/g | 0.05 | <0.01 | | <0.01 | |
| 2',3,4,4',5-PenCB | 123 | ng/g | 0.14 | <0.01 | | <0.01 | |
| Sum PentaCB | | ng/g | 32.9 | 0.09 | 99.7% | 0.14 | 99.6% |
| 2,2',3,3',4,4'-HexCB | 128 | ng/g | 3.10 | <0.01 | | 0.03 | |
| 2,2',3,4,4',5'-HexCB | 138 | ng/g | 19.4 | 0.06 | | 0.13 | |
| 2,2',3,5,5'-HexCB | 141 | ng/g | 2.85 | <0.01 | | 0.02 | |
| 2,2',3,4',5',6-HexCB | 149 | ng/g | 12.8 | 0.04 | | 0.06 | |
| 2,2',4,4',5,5'-HexCB | 153 | ng/g | 26.8 | 0.08 | | 0.19 | |
| 2,3,3',4,4',5-HexCB | 156 | ng/g | 1.45 | <0.01 | | 0.01 | |
| 2,3,3',4,4',5'-HexCB | 157 | ng/g | 0.27 | <0.01 | | <0.01 | |
| 2,3',4,4',5,5'HexCB | 167 | ng/g | 0.74 | <0.01 | | <0.01 | |
| Sum HexaCB | | ng/g | 67.3 | 0.2 | 99.7% | 0.46 | 99.3% |
| 2,2',3,3',4,4',5-HepCB | 170 | ng/g | 3.15 | 0.02 | | 0.04 | |
| 2,2',3,4,4',5,5'-HepCB | 180 | ng/g | 11.1 | 0.06 | | 0.13 | |
| 2,2',3,4,4',5',6-HepCB | 183 | ng/g | 2.55 | <0.01 | | 0.01 | |
| 2,2',3,4'5,5',6-HepCB | 187 | ng/g | 8.75 | 0.02 | | 0.05 | |
| 2,3,3',4,4',5,5'-HepCB | 189 | ng/g | 0.15 | <0.01 | | <0.01 | |
| Sum HeptaCB | | ng/g | 25.7 | 0.1 | 99.6% | 0.24 | 99.1% |
| 2,2',3,3',4,4',5,5'-Oct-CB | 194 | ng/g | 1.73 | 0.01 | 99.4% | 0.02 | 98.8% |
| 2,2',3,3',4,4'5,5',6-NonCB | 206 | ng/g | 0.5 | <0.01 | | 0.01 | 98.0% |
| DecaCB | 209 | ng/g | 7.26 | 0.09 | 98.8% | 0.18 | 97.5% |
| Sum 7 PCB | | ng/g | 89.3 | 0.31 | 99.7% | 0.62 | 99.3% |

TABLE 1-continued

| | IUPAC no. | Unit | Crude oil Value | Stripped oil: Partly refined oil Value | Stripped oil: Partly refined oil Reduction factor | Stripped oil: Water washed oil Value | Stripped oil: Water washed oil Reduction factor |
|---|---|---|---|---|---|---|---|
| Sum PCB | | ng/g | 165 | 0.63 | 99.6% | 1.20 | 99.3% |
| Sum mono-ortho PCB (TEQ-$WHO_{2005}$) | | pg/g | 0.49 | 0.00 | | 0.00 | |
| Chlorinated Pesticides | | | | | | | |
| Dieldrin | | ng/g | 15.6 | <0.13 | | <0.38 | |
| Aldrin | | ng/g | <0.01 | <0.01 | | <0.02 | |
| Isodrin | | ng/g | <0.03 | <0.03 | | <0.05 | |
| Endrin | | ng/g | <0.3 | <0.12 | | <0.16 | |
| Heptachlor-exo-epoxide | | ng/g | 1.96 | <0.10 | | <0.22 | |
| Heptachlor-endo-epoxide | | ng/g | <0.05 | <0.06 | | <0.11 | |
| trans-chlordane | | ng/g | 0.69 | <0.01 | | 0.11 | |
| cis-chlordane | | ng/g | 3.58 | <0.02 | | 0.29 | |
| Oxy-chlordane | | ng/g | 1.36 | <0.06 | | <0.17 | |
| Chlordane | | ng/g | <0.05 | <0.04 | | <0.11 | |
| Heptachlor | | ng/g | <0.14 | <0.07 | | <0.10 | |
| Endosulfan-I | | ng/g | 0.24 | <0.02 | | 0.04 | |
| HCH (Hexachlorocyclohexane) | | | | | | | |
| Alpha-HCH | | ng/g | 1.21 | <0.06 | | 0.04 | |
| Beta-HCH | | ng/g | 8.93 | <0.07 | | 0.06 | |
| Gamma-HCH | | ng/g | 0.81 | <0.07 | | <0.05 | |
| Delta-HCH | | ng/g | <0.29 | <0.96 | | <0.44 | |
| DDT | | | | | | | |
| o,p'-DDE | | ng/g | 0.99 | <0.11 | | <0.08 | |
| p,p'-DDE | | ng/g | 69.9 | <0.15 | | 0.24 | |
| o,p'-DDD | | ng/g | 2.30 | <0.12 | | <0.10 | |
| p,p'-DDD | | ng/g | 48.0 | 0.22 | | 0.53 | |
| o,p'-DDT | | ng/g | 1.41 | <0.23 | | <0.15 | |
| p,p'-DDT | | ng/g | 380 | 0.83 | | 2.46 | |
| Sum DDT | | ng/g | 503 | 1.65 | 99.7% | 3.56 | 99.3% |
| Other parameters | | | | | | | |
| Free cholesterol | | mg/g | 4.0 | 0.40 | 90% | 0.40 | 90.0% |
| Total cholesterol | | mg/g | 8.3 | 4.80 | | 4.80 | |
| Acid value before stripping | | mg KOH/g | 6.9 | 3.50 | | 6.70 | |
| Acid value after stripping | | mg KOH/g | | 0.07 | | 0.23 | |

What is claimed is:

[1. A process for reducing the amount of undesired components in a marine oil composition, comprising:

(a) providing a crude marine oil composition comprising undesired hydrophilic components, undesired lipophilic components chosen from environmental pollutants and cholesterol, and free fatty acids, (b) subjecting the crude marine oil composition to an aqueous fluid processing step, wherein undesired hydrophilic components present in the oil composition are separated from the crude marine oil composition under conditions to obtain a marine oil composition which comprises free fatty acids in an amount which is effective as an internal volatile working fluid, and (c) subjecting the marine oil composition after step (b) to a stripping processing step in the presence of free fatty acids as an internal volatile working fluid, wherein lipophilic components, particularly undesired lipophilic components, are separated from the marine oil composition together with free fatty acids, wherein the stripping processing step is a short path distillation or molecular distillation.]

[2. The process of claim 1, wherein the hydrophilic components are selected from proteinaceous compounds and optionally other water-soluble components.]

[3. The process of claim 1, where in environmental pollutants comprise polychlorinated biphenyls, brominated flame retardants and/or perfluorinated compounds.]

[4. The process of claim 1, wherein the crude marine oil composition comprises polyunsaturated fatty acids, particularly polyunsaturated omega-3 fatty acids, more particularly EPA and DHA.]

[5. The process of claim 1, wherein the crude marine oil composition comprises fatty acids in the triglyceride and/or phospholipid form.]

[6. The process of claim 5, wherein the crude marine oil composition comprises fatty acids in triglyceride form, in the range of at least 50%, 60%, 70%, 80% or 90% by weight of the crude oil composition.]

[7. The process of claim 1, wherein the aqueous fluid processing step (b) comprises contacting the crude marine oil composition with an aqueous fluid essentially without base.]

[8. The process of claim 1, wherein the aqueous fluid processing step (b) comprises contacting the crude marine oil composition with an aqueous fluid comprising a sub-equimolar amount of base with regard to the molar amount of free fatty acids in the crude marine oil composition, whereby the free fatty acids present in the crude marine oil composition are partially neutralized.]

[9. The process of claim 8, wherein the base is alkaline metal hydroxide.]

[10. The process of claim 9, wherein the base is sodium and/or potassium hydroxide.]

[11. The process of claim 1, wherein after step (b) the amount of free fatty acids in the marine oil composition is from about 0.5% by weight to about 5% by weight, preferably 1-3% by weight, most preferably about 2% by weight.]

[12. The process of claim 1, wherein before step (c) no external volatile working fluid particularly comprising fatty acid esters, fatty acid amides, free fatty acids, hydrocarbons and mixtures thereof is added to the marine oil composition.]

[13. The process of claim 1, wherein in step (c) at least about 75% by weight of free fatty acids are removed.]

[14. The process of claim 1, wherein after step (c) the amount of free fatty acids in the stripped marine oil composition ranges from about 0.2 to about 0.8% by weight.]

[15. The process of claim 14, wherein after step (c) the amount of free fatty acids in the stripped marine oil composition ranges from about 0% to 0.1%, by weight.]

[16. The process of claim 1, further comprising including an enrichment of omega-3 fatty acids.]

[17. The process of claim 16, wherein the omega-3 fatty acids comprise EPA and/or DHA to a content of at least 30% by weight based on the total weight of fatty acids to provide a nutritional additive or to a content of at least 70% by weight based on the total weight of fatty acids to provide a pharmaceutical preparation.]

[18. The process of claim 16, wherein the omega-3 fatty acids comprise EPA and/or DHA to a content of at least 30% by weight based on the total weight of fatty acids to provide a health supplement or a composition for use in clinical nutrition.]

[19. The process of claim 16, wherein the omega-3 fatty acids comprise EPA and/or DHA to a content of at least 30% by weight based on the total weight of fatty acids to provide an animal feed.]

[20. The process of claim 19, wherein the animal feed comprises a fish feed.]

[21. The process of claim 1, further comprising subjecting the marine oil composition after step (c) to at least one of:

(i) hydrolyzing the marine oil composition to provide free fatty acids, (ii) esterifying the marine oil composition to provide monoesters, (iii) subjecting the marine oil composition to urea complexation, (iv) subjecting the marine oil composition to molecular distillation, and/or (v) subjecting the marine oil composition to transesterification.]

[22. A marine oil composition product produced by the process comprising:

(a) providing a crude marine oil composition comprising undesired hydrophilic components, undesired lipophilic components chosen from environmental pollutants and cholesterol, and free fatty acids, (b) subjecting the crude marine oil composition to an aqueous fluid processing step, wherein undesired hydrophilic components present in the marine oil composition are separated from the crude marine oil composition under conditions to obtain a marine oil composition which comprises free fatty acids in an amount which is effective as an internal volatile working fluid, and (c) subjecting the marine oil composition after step (b) to a stripping processing step in the presence of free fatty acids as an internal volatile working fluid, wherein lipophilic components, particularly undesired lipophilic components, are separated from the marine oil composition together with free fatty acids, wherein the oil composition of step (c) is free from an external volatile working fluid, and wherein the stripping processing step is a short path distillation or a molecular distillation.]

[23. The marine oil composition product of claim 22, wherein the undesirable lipophilic components comprise persistent organic pollutants.]

[24. The marine oil composition product of claim 23, wherein the amount of persistent organic pollutants is reduced by at least 90%, or by at least 95%, or by at least 96%-99%, or by at least 99.9%, or by greater than 99.9%.]

[25. The marine oil composition of claim 24, wherein the persistent organic pollutants are selected from the group consisting of polychlorinated dioxins and furans, PCBs, chlorinated pesticides, hexachlorocyclohexanes, and DDTs.]

[26. A marine oil composition comprising:

free fatty acids, wherein the free fatty acids are present in an amount which is effective as an internal volatile working fluid; and undesired lipophilic components, wherein the lipophilic components are chosen from environmental pollutants and cholesterol;

wherein the marine oil composition which is substantially free from undesired hydrophilic components and from an external volatile working fluid. ]

*27. A process for reducing the amount of undesired components in a marine oil composition, comprising:*

*(a) providing a crude marine oil composition comprising proteinaceous compounds, environmental pollutants, free fatty acids, and triglycerides, wherein the triglycerides are present in amount from about 50% to about 90% by weight based on the total weight of the crude marine oil composition, and wherein the free fatty acids are present in an amount from about 2.5% to about 7.5% by weight based on the total weight of the crude marine oil composition;*

*(b) contacting the crude marine oil composition with an aqueous fluid comprising a sub-equimolar amount of base with regard to the molar amount of free fatty acids in the crude marine oil composition under conditions sufficient to separate at least a portion of the proteinaceous compounds from the crude marine oil composition and to partially neutralize the free fatty acids in the crude marine oil composition to yield a marine oil composition, wherein said conditions sufficient comprise a temperature from about 90° C. to about 99° C. followed by drying at about 90° C. to about 99° C., wherein emulsions formed while contacting the crude marine oil composition with the aqueous fluid are broken down by de-emulsifiers until phase separation is observed, wherein the sub-equimolar amount of base is sufficient to reduce free fatty acids in the marine oil composition by about 30% to about 70% by weight based on the total weight of the free fatty acids in the crude marine oil composition, and wherein the amount of free fatty acids in the marine oil composition is effective as an internal volatile working fluid; and*

(c) *subjecting the marine oil composition after step (b) to a stripping processing step to yield a processed marine oil composition, wherein the amount of environmental pollutants in the processed marine oil composition is less than 5% of the amount of environmental pollutants in the crude marine oil composition, wherein the stripping processing step is a short path distillation or molecular distillation, and wherein no external volatile working fluid comprising fatty acid esters, fatty acid amides, free fatty acids, or hydrocarbons is added to the marine oil composition prior to or during performance of the stripping processing step.*

*28. The process of claim 27, wherein the base is sodium hydroxide.*

*29. The process of claim 27, wherein the conditions sufficient in step (b) comprise contacting the crude marine oil with the aqueous fluid composition comprising the sub-equimolar amount of base for about 5 minutes to about 60 minutes.*

*30. The process of claim 27, wherein the conditions sufficient in step (b) comprise contacting the crude marine oil with the aqueous fluid composition comprising the sub-equimolar amount of base for less than 1 minute.*

*31. The process of claim 27, wherein the stripping processing step of step (c) is performed at a temperature from about 170° C. to about 220° C.*

*32. The process of claim 27, wherein the stripping processing step of step (c) is performed at a commercial scale feed rate comprising from about 10 kg marine oil composition per hour*m$^2$ heating surface to about 200 kg oil/h*m$^2$ marine oil composition heating surface.*

*33. The process of claim 32, wherein the commercial scale feed rate is from 50 kg marine oil composition per hour*m$^2$ heating surface to 100 kg marine oil composition per hour*m$^2$ heating surface.*

*34. The process of claim 27, wherein the amount of free fatty acids in the processed marine oil composition is from about 0.1% to about 1.0% by weight based on the total weight of the processed marine oil composition.*

*35. The process of claim 27, wherein the amount of free fatty acids in the processed marine oil composition is less than 0.1% by weight based on the total weight of the processed marine oil composition.*

*36. The process of claim 27, wherein the amount of free fatty acids in the marine oil composition after step (b) is from about 1% to about 3% by weight based on the total weight of the marine oil composition.*

*37. The process of claim 27, wherein the drying at about 90° C. to about 99° C. comprises drying under vacuum and with nitrogen purging.*

*38. A process for reducing the amount of undesired components in a marine oil composition, comprising:*

(a) *providing a crude marine oil composition comprising proteinaceous compounds, environmental pollutants, free fatty acids, and triglycerides, wherein the triglycerides are present in amount from about 50% to about 90% by weight based on the total weight of the crude marine oil composition, and wherein the free fatty acids are present in an amount from about 2.5% to about 7.5% by weight based on the total weight of the crude marine oil composition;*

(b) *contacting the crude marine oil composition with an aqueous fluid comprising a sub-equimolar amount of base with regard to the molar amount of free fatty acids in the crude marine oil composition under conditions sufficient to separate at least a portion of the proteinaceous compounds from the crude marine oil composition and to partially neutralize the free fatty acids in the crude marine oil composition to yield a marine oil composition, wherein said conditions sufficient comprise a temperature from about 90° C. to about 99° C. followed by drying at about 90° C. to about 99° C., wherein emulsions formed while contacting the crude marine oil composition with the aqueous fluid are broken down by de-emulsifiers until phase separation is observed, wherein the amount of free fatty acids in the marine oil composition is from about 0.5% to about 2% by weight based on the total weight of the marine oil composition, and wherein the amount of free fatty acids in the marine oil composition is effective as an internal volatile working fluid;*

(c) *subjecting the marine oil composition after step (b) to a stripping processing step to yield a processed marine oil composition, wherein the stripping processing step is a short path distillation or molecular distillation, wherein the stripping processing step is performed at a commercial scale feed rate comprising from about 10 kg marine oil composition per hour*m$^2$ heating surface to about 200 kg oil/h*m$^2$ marine oil composition heating surface, wherein the amount of environmental pollutants in the processed marine oil composition is less than the amount of environmental pollutants in the crude marine oil composition, and wherein no external volatile working fluid comprising fatty acid esters, fatty acid amides, free fatty acids, or hydrocarbons is added to the marine oil composition prior to or during performance of the stripping processing step.*

*39. The process of claim 38, wherein the commercial scale feed rate is from 50 kg marine oil composition per hour*m$^2$ heating surface to 100 kg marine oil composition per hour*m$^2$ heating surface.*

*40. The process of claim 38, wherein the wherein the amount of free fatty acids in the processed marine oil composition is not more than about 0.1% by weight based on the total weight of the processed marine oil composition.*

*41. The process of claim 38, wherein the stripping processing step of step (c) is performed at a temperature from about 170° C. to about 220° C.*

*42. The process of claim 38, wherein the base is sodium hydroxide.*

*43. The process of claim 38, wherein said conditions sufficient in step (b) comprise contacting the crude marine oil with the aqueous fluid composition comprising the sub-equimolar amount of base for about 5 minutes to about 60 minutes.*

*44. The process of claim 38, wherein said conditions sufficient in step (b) comprise contacting the crude marine oil with the aqueous fluid composition comprising the sub-equimolar amount of base for less than 1 minute.*

*45. The process of claim 38, wherein the drying at about 90° C. to about 99° C. comprises drying under vacuum and with nitrogen purging.*

* * * * *